(12) United States Patent
De Smet et al.

(10) Patent No.: US 9,392,082 B2
(45) Date of Patent: Jul. 12, 2016

(54) COMMUNICATION INTERFACE AND METHOD FOR ROBUST HEADER COMPRESSION OF DATA FLOWS

(71) Applicant: Nvidia Corporation, Santa Clara, CA (US)

(72) Inventors: Bruno De Smet, Sophia Antipolis (FR); Fabien Besson, Sophia Antipolis (FR); Alexander May-Weymann, Sophia Antipolis (FR)

(73) Assignee: Nvidia Corporation, Santa Clara, CA (US)

( * ) Notice: Subject to any disclaimer, the term of this patent is extended or adjusted under 35 U.S.C. 154(b) by 204 days.

(21) Appl. No.: 14/025,579

(22) Filed: Sep. 12, 2013

(65) Prior Publication Data

US 2015/0071307 A1    Mar. 12, 2015

(51) Int. Cl.
*H04J 3/18* (2006.01)
*H04L 29/06* (2006.01)

(52) U.S. Cl.
CPC .............. *H04L 69/22* (2013.01); *H04L 65/602* (2013.01); *H04L 65/607* (2013.01); *H04L 65/608* (2013.01); *H04L 65/80* (2013.01); *H04L 69/04* (2013.01)

(58) Field of Classification Search
CPC ....... H04L 69/22; H04L 69/04; H04L 65/602; H04L 65/607; H04L 65/608; H04L 65/80
See application file for complete search history.

(56) References Cited

U.S. PATENT DOCUMENTS

| | | | |
|---|---|---|---|
| 2005/0201366 A1* | 9/2005 | Kim et al. ..................... | 370/353 |
| 2006/0075134 A1* | 4/2006 | Aalto et al. .................... | 709/238 |
| 2010/0172375 A1* | 7/2010 | Rochon et al. ................ | 370/474 |
| 2013/0279380 A1* | 10/2013 | Hong et al. ................... | 370/310 |
| 2015/0071307 A1* | 3/2015 | De Smet et al. .............. | 370/477 |

* cited by examiner

*Primary Examiner* — Robert Wilson

(57) ABSTRACT

A communication interface and method for efficient robust header compression (RoHC). One embodiment of the communication interface includes: (1) a data flow associated with a context ID (CID) and a data flow status indicator, and having packets, and (2) a robust header compression (RoHC) compressor configured to employ the CID to compress headers of the packets and to mark the CID as reusable by another data flow if the data flow status indicator indicates the data flow is terminated.

21 Claims, 2 Drawing Sheets

COMMUNICATION INTERFACE AND METHOD FOR ROBUST HEADER COMPRESSION OF DATA FLOWS

TECHNICAL FIELD

This application is directed, in general, to robust header compression (RoHC) of data flows and, more specifically, to identifying a terminated data flow and marking the associated RoHC context ID (CID) for reuse by another data flow.

BACKGROUND

Global internet protocol (IP) traffic has quadrupled over the past five years and will likely sustain that pace. Growth in network bandwidth demand could soon outpace the telecommunication industry's ability to deliver. Recent increases in bandwidth demand are due largely to the advent of mobile internet devices, such as smartphones and tablet computers. Compounding the growing number of mobile internet devices, which will soon outnumber the people on Earth, is the fact that video constitutes a majority of the IP traffic. Video streaming consumes significantly larger amounts of bandwidth than typical file sharing and audio.

Bandwidth scarcity is a pressing problem for the telecommunication industry. While some industry players wrestle with the technology to expand network bandwidth, others focus on making existing networks and devices more efficient. RoHC is a standardized method of compressing IP, user datagram protocol (UDP), UDP-Lite, real-time transport protocol (RTP) and transmission control protocol (TCP) headers of internet, or "network packets." Network packets are formatted units of data transmitted and received over a network. Each packet carries data, which is sometimes referred to as payload or user data, and a header, which contains control data. The header portion of a network packet is essentially the overhead associated with transmitting and receiving that one packet. The control data is necessary for the network to deliver the user data and includes source and destination addresses, error detection data, timestamps and other fields.

RoHC takes advantage of information redundancies in the packet headers by transmitting redundant information once at the beginning of a data flow and only variable information from then on. For example, given a data flow between a source and a destination, the source and destination addresses need only be transmitted once, when the data flow initiates. The bytes allocated to the source and destination addresses are omitted from subsequent packet headers. A RoHC compressor converts the large packet headers into smaller, compressed packet headers before transmission and receipt. A RoHC decompressor at the receiver reconstructs the original packet headers from the received compressed packet headers.

SUMMARY

One aspect provides a communication interface. In one embodiment, the interface includes: (1) a data flow associated with a context ID (CID) and a data flow status indicator, and having packets, and (2) a robust header compression (RoHC) compressor configured to employ the CID to compress headers of the packets and to mark the CID as reusable by another data flow if the data flow status indicator indicates the data flow is terminated.

Another aspect provides a method of RoHC. In one embodiment, the method includes: (1) employing a CID to compress packet headers of a data flow, (2) extracting a data flow status indicator, and (3) marking the CID as reusable if the data flow status indicator indicates the data flow is terminated.

Yet another aspect provides a modem. In one embodiment, the modem includes: (1) a protocol stack configured to receive packets of a data flow, the packets having respective headers, and (2) a RoHC compressor configured to: (2a) employ a CID to compress the respective headers, (2b) determine if the data flow is terminated based on a data flow status indicator associated with the data flow, and (3) mark the CID as reusable by another data flow if the data flow is terminated.

BRIEF DESCRIPTION

Reference is now made to the following descriptions taken in conjunction with the accompanying drawings, in which.

DETAILED DESCRIPTION

RoHC supports multiple data flows operating in parallel. Each data flow is assigned a context ID (CID) by the RoHC compressor. The same CID is used by the decompressor to reconstruct the original packet header. The CID for a given compressed packet header associates it with a previously received packet header. The later packet header contains only deltas from the previously received. Given multiple parallel data flows, each data flow having a unique CID allows for the most efficient compression.

Many RoHC compressors have a limited set of CID values to assign parallel data flows. Once the limited set is fully utilized, CID values are assigned multiple data flows. Consequently, two consecutive packets will occasionally belong to different data flows and information redundancies in their respective packet headers will be diminished. With fewer redundancies to leverage, RoHC is less efficient and the transmission will consume more bandwidth.

It is realized herein that the RoHC compressor can mark a CID as available for reuse when a data flow is terminated, given a data flow status indicator. This allows the RoHC compressor to avoid assigning one CID to multiple data flows. It is also realized herein that the data flow status indicator is available in the data flow itself. TCP and RTP data flows include data flow status information, including control flags and control protocols. A TCP packet includes control bit-flags, such as the "FIN" bit that indicates no further data is available from the sender. An RTP data flow includes an RTP control protocol (RTCP) data flow that carries control messages among participants. One such control message is a "BYE" message that indicates a source is terminating the data flow.

It is further realized herein that the RoHC compressor can gain direct access to data flow status information if the TCP or RTP stacks are integrated with the RoHC compressor. This is typically the case when a single protocol stack implements RoHC and the TCP stack, RTP/RTCP stack or both. Alternatively, it is realized herein that the RoHC implementation can parse TCP packets formed by an independent TCP stack, or RTCP packets formed by an independent RTP/RTCP stack.

Figure 1:
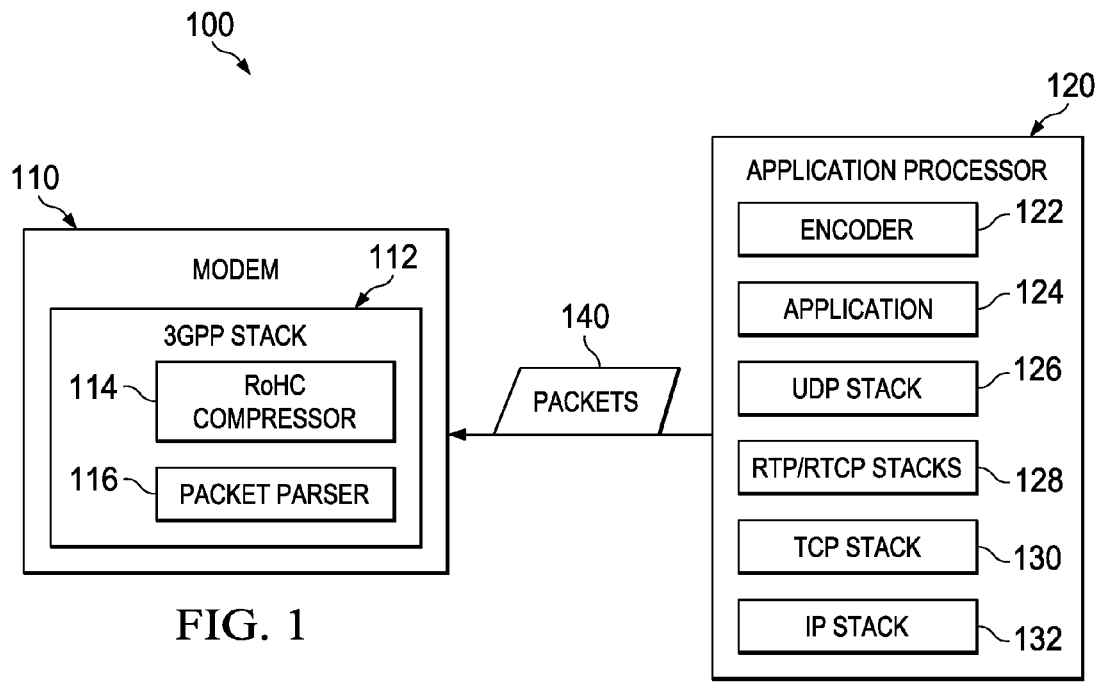
FIG. 1 is a block diagram of one embodiment of a communication system having RTP/RTCP, TCP, UDP and IP stacks implemented on an application processor.

FIG. 1 is a block diagram of one embodiment of a system 100 capable of efficient RoHC. System 100 includes a modem 110 and application processor 120. Application processor 120 is operable to execute an application 124 that generates the payload data for a data flow. Certain embodiments of application processor 120 include an encoder 122 for encoding raw data streams from application 124 before being packetized and transmitted. For example, applications that generate video streams often utilize an H.264 or MPEG-4 AVC encoder. Audio streams may use an MPEG-4 or MP3 encoder, among many others. Examples for voice applications include encoders such as SVOPC, which is used by Skype®, or ITU standard G.722.2, which is mentioned in the 3GPP standard and sometimes referred to as AMR-WB.

Additionally, a UDP stack 126, RTP/RTCP stacks 128, a TCP stack 130 and an IP stack 132 are implemented on application processor 120. Within application processor 120, application 124 generates the data and invokes the appropriate encoder and stack. For example, a typical data sharing application may utilize TCP stack 130. TCP is often used in web browser, email and file transfer applications. Another example is a video teleconference application that utilizes RTP/RTCP stacks 128. RTP is well suited for carrying video and audio streams and is commonly used in streaming media applications such as telephony, video teleconferencing, television services and push-to-talk applications. A well-known example of these applications is voice-over-IP (VOIP).

Application processor 120 executes application 124, thereby generating data and initiating the data flow. The data generated by application 124 includes control data, which includes data flow status information, and payload data. Payload data is encoded by encoder 122. The appropriate stack packetizes the payload data and control data into packets 140. If application 124 utilizes TCP stack 130, the control data is packed into the headers of the TCP packets. If application 124 utilizes RTP/RTCP stacks 128, the control data is packed into RTCP packets that accompany the RTP packets.

In certain embodiments, where application 124 is a video teleconferencing application and encoder 122 is a H.264 codec, application processor 120 executes application 124 to generate data that is encoded by encoder 122, then the H.264 stream is packetized by RTP/RTCP stacks 128.

Modem 110 includes a 3$^{rd}$ Generation Partnership Program (3GPP) stack 112 that implements a RoHC compressor 114 and a packet parser 116, among many other modules. In alternate embodiments, modem 110 can include other protocol stacks, distinct from 3GPP stack 112. Other protocol stacks can also implement RoHC compressor 114 and packet parser 116.

Modem 110 receives packets 140 and prepares them for transmission over a medium, such as a wireless, wired or optical network. Modem 110 is configured to transmit over a long-term evolution (LTE), 3G or 2G network, to which the 3GPP standard applies. Packet parser 116 is configured to gain access to packets 140 to extract the control data, including the data flow status information. The data flow status indicator is then passed along to RoHC compressor 114. RoHC compressor 114 processes packets 140 by initially assigning a CID to the data flow and compressing the packet headers. Compression is achieved by transmitting the differences between a current packet and a previous packet. Depending on the level of compression, certain levels of redundancy between successive packets is left in the packet headers to improve reliability of the data flow. The most efficient RoHC transmits only the deltas between consecutive packet headers. RoHC compressor 114 checks the data flow status information and, if the data flow status indicator indicates the data flow is terminated, marks the assigned CID as reusable by another data flow.

Figure 2:
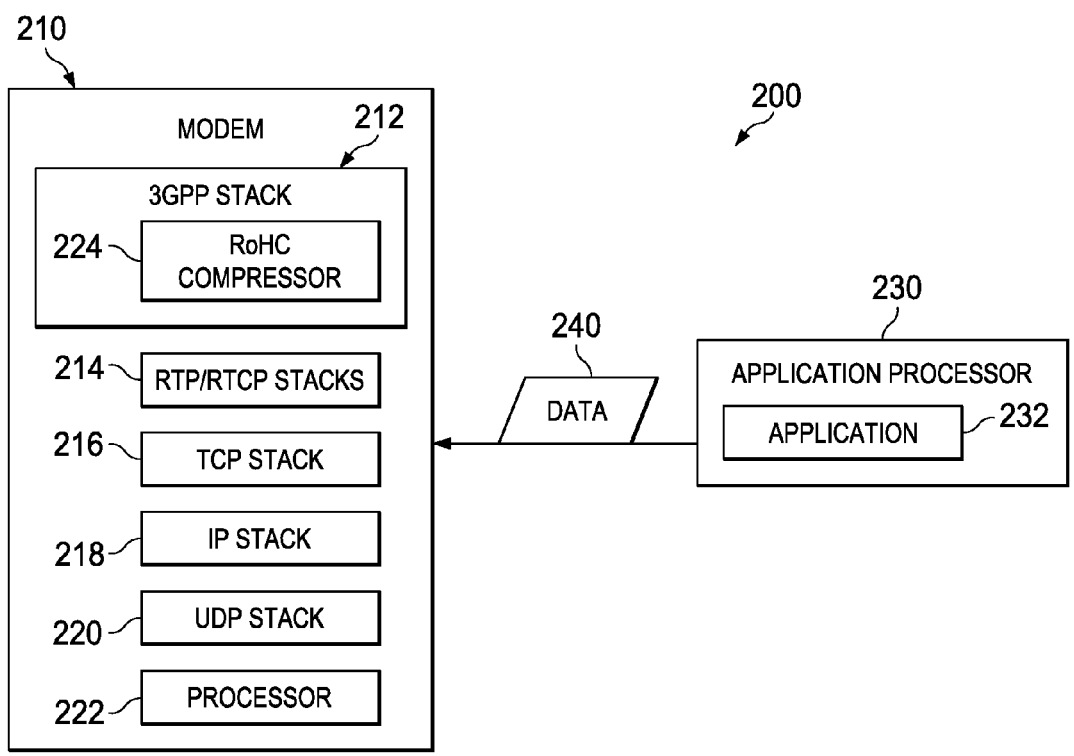
FIG. 2 is a block diagram of another embodiment of a communication system having RTP/RTCP, TCP, UDP and IP stacks implemented on a modem.

FIG. 2 is a block diagram of another embodiment of a system 200 capable of efficient RoHC. System 200 includes a modem 210 and an application processor 230. Application processor 230 executes an application 232, thereby generating data 240, which includes payload data and control data for a data flow. Modem 210 includes a 3GPP stack 212, RTP/RTCP stacks 214, a TCP stack 216, an IP stack 218, a UDP stack 220 and a processor 222. In alternate embodiments, application 232 executes on processor 222. For example, certain embodiments of modem 210 are configured to execute a subscriber identity module (SIM) application that runs entirely within modem 210, relying on no data from application processor 230.

Upon receipt of data 240, modem 210 employs one of either RTP/RTCP stacks 214, TCP stack 216, IP stack 218 or UDP stack 220 to packetize the payload data and control data generated by application processor 230. 3GPP stack 212 includes a RoHC compressor 224. RoHC compressor 224 is configured to assign a CID to the data flow and compress the headers of the packets. Modem 210 then transmits those packets onto a network. RoHC compressor 224 is further configured to gain access to the control data for the data flow and, more specifically, the data flow status information that is otherwise packed into the packets of the data flow. For example, in a TCP data flow, control bit-flags are embedded in the header of each TCP packet generated by TCP stack 216. These control bit-flags, or simply "bit-flags," include a data flow status indicator that indicates if the data flow is terminated. Another example is in an RTP data flow. Control data for an RTP data flow is packed into RTCP packets that accompany the RTP packets, both the RTP packets and RTCP packets being generated by RTP/RTCP stacks 214. An RTCP packet includes a BYE message when the RTP data flow is terminated. The BYE message constitutes a data flow status indicator for an RTP data flow. Given access to the data flow status indicator, RoHC compressor 224 marks the assigned CID as reusable by another data flow.

Figure 3:
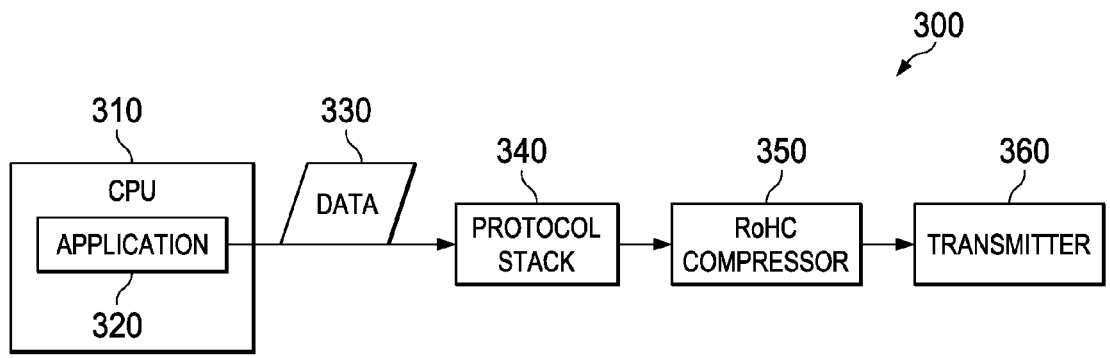
FIG. 3 is a block diagram of one embodiment of a communication interface that employs RoHC compression.

FIG. 3 is a block diagram of one embodiment of a communication interface 300 capable of efficient RoHC. Communication interface 300 includes a CPU 310, a protocol stack 340, a RoHC compressor 350 and a transmitter 360. CPU 310 is configured to execute an application, thereby generating data 330. Data 330 includes payload data and control data for a data flow. Data 330 is received by protocol stack 340. Protocol stack 340 packetizes and prepares data 330 for transmission. RoHC compressor 350 is configured to compress packet headers of the data flow using an assigned CID. RoHC compressor 350 is also configured to gain access to the control data of data 330. The control data includes data flow status information useful to RoHC compressor 350 for determining if the data flow is terminated. The specific control data varies across the various types of data flows. For example, a TCP data flow includes control data in the TCP packet headers, including a FIN bit that indicates whether or not the data flow has terminated. Another example, for RTP data flows, control data is packetized into RTCP packets by an RTP/RTCP stack. An RTCP packet includes an end of participation, or BYE, message that indicates the data flow is terminated. If the data flow is terminated, RoHC compressor 350 marks the assigned CID as reusable by another data flow.

Alternate embodiments can include various codecs for encoding data 330 before packetizing. Other embodiments can implement CPU 310, protocol stack 340, RoHC compressor 350 and transmitter 360 in a single device. Yet other embodiments divide application processing, RoHC and the various stack implementations across several devices, as in the embodiments of FIG. 1 and FIG. 2. Ultimately, compressed encoded data is transmitted to a network via transmitter 360.

Figure 4:
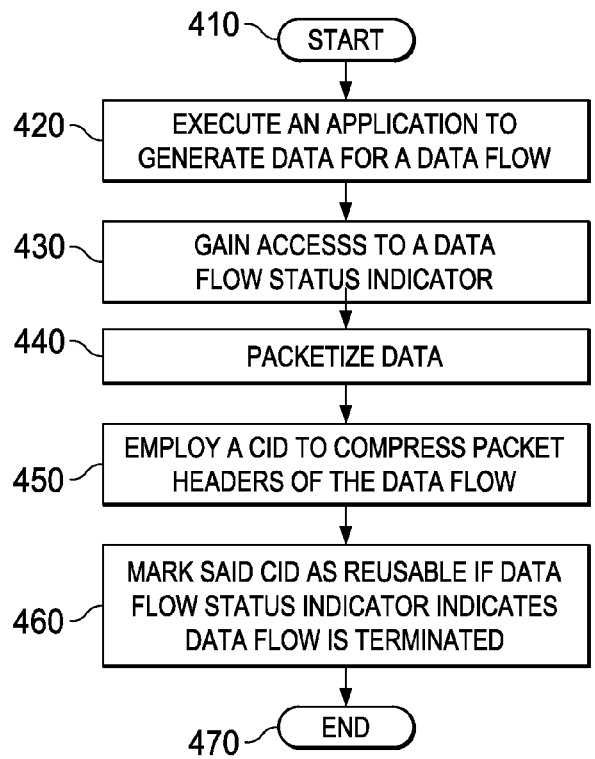
FIG. 4 is a flow diagram of one embodiment of a method of RoHC.

FIG. 4 is a flow diagram of one embodiment of a method for RoHC. The method begins in a start step 410. In an execution step 420, an application is executed, thereby generating data for a data flow. This data includes both payload and control data. Control data includes data flow status information and, more specifically, a data flow status indicator, such as a TCP control bit-flag and an RTCP BYE message. In a decision step 430, access is gained to the data flow status indicator and a determination is made as to whether the data flow has terminated. The payload and control data are packetized in a packetizing step 440. The structure of the packets depends on the protocol used. TCP packets include control data in the packet headers, while RTP packets are accompanied by RTCP packets that contain the control data.

In alternate embodiments, access to the data flow status indicator is not had until after the data is packetized at packetizing step 440. In those cases, an additional parsing step is added to parse the packets before they are compressed and transmitted. Parsing allows the RoHC compressor to make the determination otherwise made in decision step 430.

In the embodiment of FIG. 4, data flow packets are processed by the RoHC compressor in a RoHC step 450. The RoHC compressor assigns a CID to the data flow and compresses the packet headers of the data flow. If the data flow status indicator indicates the data flow is terminated, the assigned CID is marked as reusable for another data flow in a marking step 460. The method then ends in an end step 470.

Those skilled in the art to which this application relates will appreciate that other and further additions, deletions, substitutions and modifications may be made to the described embodiments.

What is claimed is:

1. A communication interface, comprising:
a processor configured to generate data for a data flow having packets and associated with a context ID (CID) and a data flow status indicator, and provide a robust header compression (RoHC) compressor that employs said CID to compress headers of said packets and marks said CID as reusable by another data flow if said data flow status indicator indicates said data flow is terminated; and
a transmitter configured to transmit said packets.

2. The communication interface recited in claim 1 wherein said data flow is a real-time transport protocol (RTP) data flow.

3. The communication interface recited in claim 2 wherein said data flow status indicator is contained within an RTP control protocol (RTCP) data flow having RTCP packets.

4. The communication interface recited in claim 3 wherein said RoHC compressor further parses said RTCP packets to extract said data flow status indicator.

5. The communication interface recited in claim 1 wherein said data flow is a transmission control protocol (TCP) data flow having TCP packets.

6. The communication interface recited in claim 5 wherein said data flow status indicator includes a control bit-flag contained within said TCP packets.

7. The communication interface recited in claim 1 wherein said processor is configured to execute an application that is operable to generate said data in said packets and provide a protocol stack that packetizes said data into said packets.

8. A method of robust header compression (RoHC), comprising:
employing a context ID (CID) to compress packet headers of a data flow;
gaining access to a data flow status indicator; and
marking said CID as reusable if said data flow status indicator indicates said data flow is terminated, wherein said employing, said gaining and said marking are performed by a processor.

9. The method recited in claim 8 wherein said gaining access includes parsing packets of said data flow.

10. The method recited in claim 8 further comprising:
executing an application to generate data for said data flow; and
packetizing said data.

11. The method recited in claim 10 wherein said packetizing includes packing said data into real-time transport protocol (RTP) packets and RTP control protocol (RTCP) packets.

12. The method recited in claim 11 wherein said RTCP packets contain RTCP data and said gaining access is carried out before said packetizing.

13. The method recited in claim 10 wherein said packetizing includes packing said data into transmission control protocol (TCP) packets.

14. The method recited in claim 13 wherein said data flow status indicator is a control bit-flag in said TCP packets.

15. A modem, comprising:
a modem processor configured to provide a protocol stack that is operable to receive packets of a data flow, said packets having respective headers;
a robust header compression (RoHC) compressor that is operable to:
employ a context ID (CID) to compress said respective headers,
determine if said data flow is terminated based on a data flow status indicator associated with said data flow, and
mark said CID as reusable by another data flow if said data flow is terminated; and
a transmitter configured to transmit said packets.

16. The modem recited in claim 15 further comprising a real-time transport protocol/real-time transport control protocol (RTP/RTCP) stack operable to generate said packets from data generated by an application.

17. The modem recited in claim 16 wherein said data includes RTCP data to which said RoHC compressor is configured to gain access, said RTCP data including said data flow status indicator.

18. The modem recited in claim 15 further comprising a transmission control protocol (TCP) stack operable to generate said packets from data generated by an application, wherein said data and said packets include said data flow status indicator.

19. The modem recited in claim 18 wherein said RoHC compressor is configured to gain access to said data flow status indicator in said data.

20. The modem recited in claim 15 wherein said packets are receivable by said modem processor over a data bus coupled to an application processor configured to:
execute an application to generate data; and
employ a real-time transport protocol/real-time transport control protocol (RTP/RTCP) stack to generate said packets.

21. The modem recited in claim 20 further comprising a packet parser operable to extract said data flow status indicator from said packets received from said application processor.

\* \* \* \* \*